US006781977B1

(12) United States Patent
Li

(10) Patent No.: US 6,781,977 B1
(45) Date of Patent: Aug. 24, 2004

(54) WIDEBAND CDMA MOBILE EQUIPMENT FOR TRANSMITTING MULTICHANNEL SOUNDS

(75) Inventor: Yingtao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 09/674,936

(22) PCT Filed: Mar. 15, 2000

(86) PCT No.: PCT/CN00/00051

§ 371 (c)(1), (2), (4) Date: Nov. 8, 2000

(87) PCT Pub. No.: WO00/56093

PCT Pub. Date: Sep. 21, 2000

(30) Foreign Application Priority Data

Mar. 15, 1999 (CN) .................................... 99 1 02896 A

(51) Int. Cl.[7] ............................................... H04B 7/216

(52) U.S. Cl. ....................................... 370/335; 370/342

(58) Field of Search ................................ 370/328, 335, 370/342, 329, 341, 431, 441; 455/403, 422, 73, 550; 381/22, 18, 19, 20, 21, 23, 1

(56) References Cited

U.S. PATENT DOCUMENTS 5,638,452 A * 6/1997 Waller, Jr. .................. 381/22
5,802,187 A * 9/1998 Hsu .......................... 381/119
5,982,902 A * 11/1999 Terano ........................ 381/17
6,230,141 B1 * 5/2001 Bohm et al. ................ 704/503
6,307,941 B1 * 10/2001 Tanner et al. ................ 381/17

* cited by examiner

*Primary Examiner*—Ajit Patel
(74) *Attorney, Agent, or Firm*—Trop, Pruner & Hu, P.C.

(57) ABSTRACT

The present invention discloses a wideband CDMA mobile equipment capable of transmitting real-time bi-directional multichannel sound, which can be used in mobile station, handset or vehicle station. It comprises sending unit, receiving unit, central processing unit (CPU) and duplexer both connecting with the said sending and receiving unit. In the sending unit the stereo source is encoded into data stream, emitted after modulated by broadband CDMA into the prescriptive radio communication frequency range. In the receiving unit the radio signal carrying stereo is received with wideband CDMA and restored into digital code stream, then decoded into high quality of stereo sound. In combination of image encoding, the mobile communication system can provide not only bi-directional voice service, but also the services of the high quality of music or multichannel sound and image.

15 Claims, 2 Drawing Sheets

WIDEBAND CDMA MOBILE EQUIPMENT FOR TRANSMITTING MULTICHANNEL SOUNDS

FIELD OF THE INVENTION

The present invention relates to mobile communication in general, and in particular to the wideband code division multiple access (CDMA) mobile equipment capable of transmitting bi-directional real-time multichannel sound.

BACKGROUND OF THE INVENTION

Sound can usually be divided into single-channel or multi-channel sound, and further into narrowband or wideband sound by virtue of sound bandwidth. Common amplitude modulation (AM) broadcasting and wire-telephone fall into single-channel sound with bandwidth less than 4 KHz and poorer sound quality; frequency modulation (FM) stereo broadcasting pertains to multichannel sound with bandwidth about 15 KHz and better sound quality.

Generally speaking, broadcasting and television are also part of mobile communication system when they are in a mobile status. FM broadcasting system and mobile station can only, however, receive stereo or multichannel music and voice. They can not carry out bi-directional voice or character information transmission, therefore they are not the mobile communication system in common sense. On the other hand, although such the mobile communication systems mainly for exchanging information, as cellular mobile telephone, radio pager and satellite mobile communication etc. can provide bi-directional voice and character information exchange or transmission, they cannot provide music or multichannel sound service of high quality.

The mobile communication system has evolved from the first generation (1G) of mobile analog cellular system to the second generation (2G) of mobile digital cellular system. Based on the core technologies of analog modulation and frequency division multiple access (FDMA), the 1G mobile communication system used to transmit analog voice. While, based on the core technologies of digital transmission and time division multiple access (TDMA), the 2G mobile communication system is capable of transmitting encoded digital voice. Whether 1G or 2G system is, however, restricted by the transmission technology and capacity of subscriber. In order to transmit more voice within the restricted bandwidth the quality of analog or digital voice had to be degraded, so that neither of them could transmit high quality of sound, to say nothing of the transmission of multichannel music and voice. As far as the present applicant knows, there has not been so far any bi-directional communication equipment that can provide multichannel sound simultaneously in a mobile device.

SUMMARY OF THE INVENTION

CDMA digital cellular mobile communications system can, with large system capacity only restricted by interference, other than the bandwidth-restricted capacity of FDMA and TDMA, better realize the broadband data transmission. It can be the basis of providing bi-directional, high purity and high quality of multichannel sound service on the digital mobile communication system.

The present invention provides wideband CDMA mobile equipment capable of transmitting multichannel sound, so that the existing mobile communication system can, at the same time of information exchange, transmit high quality of sound. The user can not only obtain the demanded information, but also enjoy the music and voice service of high purity and quality from the mobile communication system.

The present invention further actualizes real-time bi-directional multichannel sound and image communication in combination of image encoding.

The wideband CDMA mobile equipment capable of transmitting multichannel sound according to the present invention, comprises sending unit, receiving unit, central processing unit (CPU) connecting with the said sending and receiving unit, duplexer connecting with the said sending and receiving unit, and antenna connecting with the said duplexer; wherein:

The said sending unit includes at least pickup sets, sound signal pre-processing sets, sound signal encoder, channel encoder, wideband CDMA modulator and radio-frequency (RF) sender; they are linked in a sequence; the output of the RF sender, connecting with the input of the duplexer, sends out to the antenna;

The said receiving unit includes at least RF receivers, wideband CDMA demodulator, channel decoder, sound signal decoder, sound signal post-processors and reproducer; they are linked in a sequence; the signal from antenna will be sent to the RF receiver via the duplexer;

The above pickup sets are composed of more than one pickup; the said sound signal pre-processing sets are composed of more than one sound signal pre-processor, with each sound signal pre-processor corresponding to one pickup; the said sound signal post-processing sets are composed of more than one sound signal post-processor.

According to the above technical scheme, the said sending unit includes further pick-up heads, image signal pre-processing unit and image signal encoder. They are linked in a sequence. The output of the image signal encoder is connected with input of the said channel encoder. The said receiving unit includes further image signal decoder, image signal post-processing unit and monitor. They are also linked in a sequence. The input of the image decoder is connected with the output of the channel decoder.

There are two or more than two of the said pickups that may be general or Hi-Fi pickup, or linked to sound source device by the line-in interface of multichannel sound.

The said sound reproducers is speaker sets or multichannel earphones, or can be linked out to other playing device by the line-out interface of multichannel sound.

The said sound signal encoder may be the sound signal encoder MP3 based on MPEG standard or the digital encoder in a CD player, or even AC-3 algorithm.

The said wideband CDMA modulator is a modulator with BPSK or QPSK spread spectrum mode keeping in line with the spread spectrum mode of the RF sender.

The said wideband CDMA demodulator is a demodulator with correlation operation as de-spreading spectrum mode and enhancing signal by RAKE receiver mode.

The said duplexer has two modes, i.e. frequency division duplex (FDD) and time division duplex (TDD). In the case of TDD mode, the said duplexer is connected with the CPU controlling the on-off of receiving and sending.

The said CPU includes central processor and attaching circuits containing man-machine interface circuit. The attaching circuits include at least large-scale memory unit capable of storing the received multichannel sound data.

The mobile equipment, according to the present invention, can access the system as terminal equipment of the mobile communication system in forms of portable machine, handset or vehicle machine.

In the sending unit of the mobile equipment, according to the present invention, the pickup sets or multichannel input device can produce electrical signal of multichannel sound. Signals from each sound source are multichannel-preprocessed respectively, including A/D transformation, via each channel, and then sent to the multichannel sound signal encoder. The signal encoder outputs digital code stream continuously or by frame, which will be sent to the channel encoder to increase capability of anti-interferences. The data output from the channel encoder will then be emitted after being modulated by wideband CDMA modulator to the specified radio communication band. In the receiving unit, the received radio signals are demodulated with wideband CDMA to restore the data stream containing sound signal. The data stream is, through the channel decoder and the sound signal decoder, sent to the sound signal post-processor, and then high quality of sound will be restored by speaker or multichannel earphone.

On account of the wideband CDMA digital transmission technology adopted in the mobile equipment of the present invention, under the precondition of ensuring transmission quality of bi-directional voice and character as well as capacity of subscribers, sufficient transmission bandwidth can be provided to support the bandwidth requirement of transmitting bi-channel music or voice. The mobile equipment of the present invention utilizes the high quality of voice encoding technology to support as FM and CD music or voice services. The mobile equipment of the present invention further utilizes multichannel earphone or speaker to restore multichannel sound. It also has optional multichannel output interfaces.

Owing to the multichannel source encoding and wideband CDMA transmission technology adopted in the present invention, it can provide high quality of multichannel e.g. stereo voice or music, and enjoyable sound service on the mobile equipment of the mobile communication system. In combination with the image encoding technology, a real-time bi-directional multichannel sound and image communication can be realized at the same time.

BRIEF DESCRIPTION OF THE ATTACHED DRAWINGS

PREFERRED EMBODIMENTS OF THE INVENTION

The invention will be described in detail with reference to the embodiments and the attached drawings.

Figure 1:
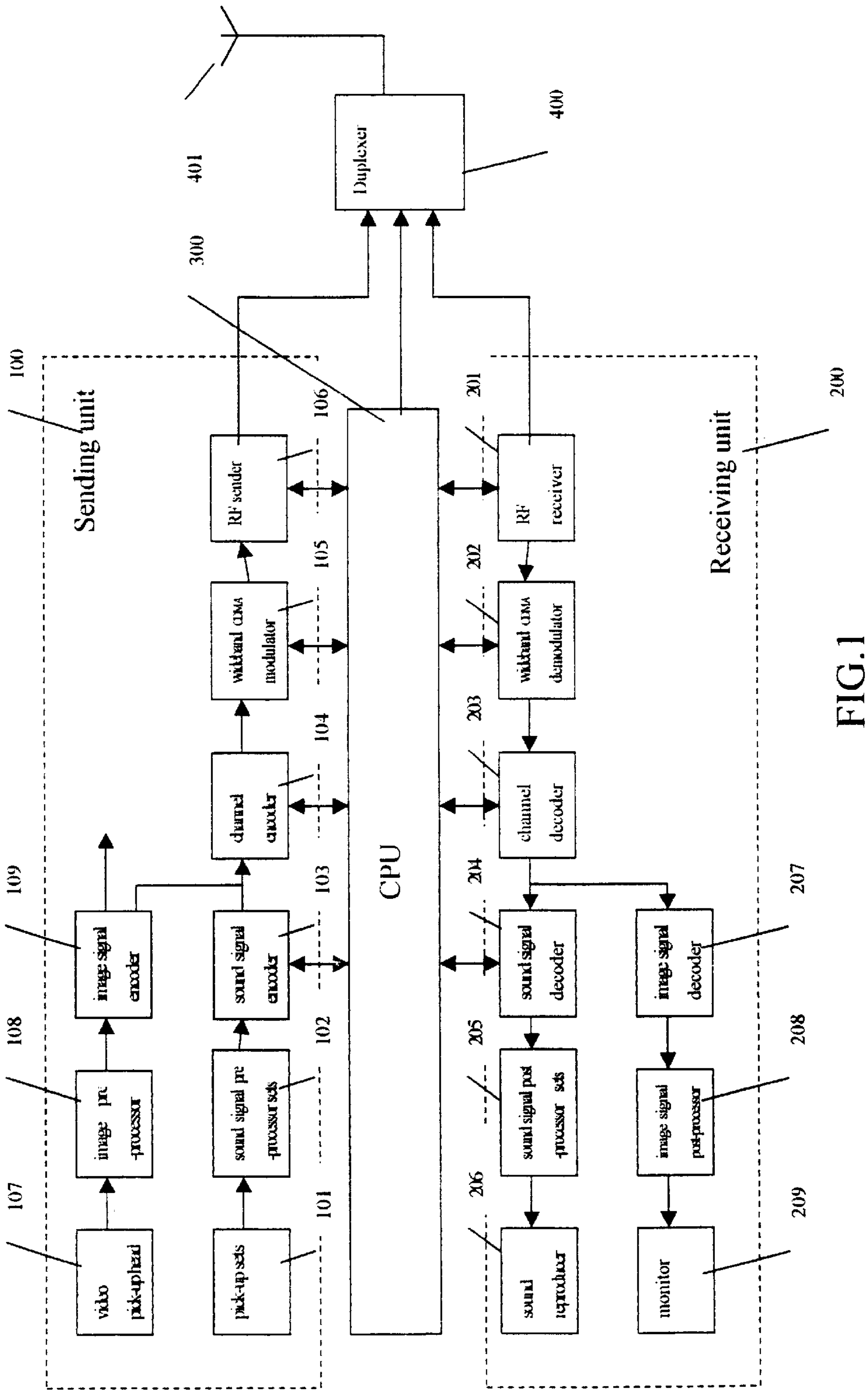
FIG. 1 is a principle block diagram showing the structural of the wideband CDMA mobile equipment capable of transmitting multichannel sound.

As shown in FIG. 1, the wideband CDMA mobile equipment capable of transmitting multichannel sound, according to the present invention, includes the sending unit 100, the receiving unit 200, the central processing unit (CPU) 300, the duplexer 400 and the emission antenna 401. The duplexer 400 connects with the emission antenna 401.

CPU 300 includes central processor and attaching circuits containing man-machine interface, used for controlling the whole device.

The sending unit 100 at least includes the pickup sets 101, the sound signal pre-processor sets 102, the sound signal encoder 103, the channel encoder 104, the wideband CDMA modulator 105 and the radio frequency (RF) sender 106. It can further include the video pick-up head 107, the image pre-processor 108 and the image signal encoder 109.

The receiving unit 200 at least includes the RF receiver 201, the wideband CDMA demodulator 202, the channel decoder 203, the sound signal decoder 204, the sound signal post-processor sets 205 and the sound reproducer 206. It can further include the image signal decoder 207, the image signal post-processor 208 and the monitor 209.

In the sending unit 100, there are two or more than two pickups in the pickup sets 101, which may be general or Hi-Fi pickup. Sound will be transformed into a group of analog electrical signals by the pickup sets 101. The analog sound-electrical signals are, through the sound signal pre-processor sets 102, modulated to a suitable scope of amplitude and frequency, and then sent to the sound signal encoder 103. Taking FM dual channel sound as an example, the sound signal pre-processor sets 102 wipes off the signals of frequency beyond 15 KHz and regulates the signal amplitude to a quantifiable extent which is acceptable by the sound signal encoder 103, e.g., 1 Vp-p value corresponding with 16 bit linear quantified value. The output from the sound signal encoder 103 is the encoded bit, the digital signal. The sound signal encoder 103 may be the sound signal encoder under the standard of MPEG or the digital encoder in CD player; or even the AC-3 algorithm produced by Dolby. The sound signal encoder 103 can output digital signals continuously or by frame, just like the common G.729 encoding. The channel encoder 104 is used to increase information redundancy and capability of error correcting. Error correcting coding can adopt Convolutional coding or Turbo coding suitable for high code rate. When the sound signal encoder 103 uses frame-output mode, interlace can be added properly in the channel encoder 104 to further enhance the capability of anti-interference. The frame duration may be 5 or 10 ms; interlace duration may be 50 or 30 ms. The data encoded by the channel encoder is sent to the wideband CDMA modulator 105 to complete spread spectrum. The way of spreading spectrum may be either BPSK or QPSK, so long as it keeps in line with the design of the RF sender 106 and meets the requirement of spectrum. Signals are, after spread spectrum, sent to the RF sender 106, in which they are modulated to the carrier suitable to emit. And then they are sent to the duplexer 400, after amplified properly, to emit to the antenna 401. The RF sender 106 includes local oscillator to produce appropriate RF carrier. The modulation of RF carrier may adopt the way of direct or mixing modulation. There are many ways of modulation for option, such as QPSK or QQPSK. Besides, the RF sender 106 should include filter for restricting bandwidth and power amplifier for amplifying signals. And the structural design of the RF sender 106 should keep in line with the RF receiver 201.

The functions of the pick-up head 107, the image signal pre-processor 108 and the image signal encoder 109 are the same as those of the pickup sets 101, the sound signal pre-processing sets 102 and the sound signal encoder 103 respectively, but only the object of signal processing is image. The compressing coding of image signals may be MPEG image encoding.

When the receiving unit 200 receives signals, the signals from antenna are sent to the RF receiver 201 via the duplexer 400. The RF receiver 201 includes filter, low noise amplifier, transducer or demodulator with the same structural design as that of the RF sender 106. The signals passing through the RF receiver 201 are transformed into the form suitable for the wideband CDMA demodulator 202. The signals are de-spreaded spectrum in the wideband CDMA demodulator 202. The usual way of de-spreading spectrum is correlation operation and RAKE receiver is used to enhance the signals. The decision will be made first, after demodulation, and then sent to the channel decoder 203. The decision can be made by hard or soft. However, soft decision, in which the decision procedure is completed in the channel decoder 203, is more advantageous to the enhancement of the performance of the channel decoder. The data error-corrected -by the channel decoder 203 are sent to the sound signal decoder 204, in which the digital signals are restored to the original analog multichannel sound. Only after such multichannel analog sound is processed by the sound signal post-processor sets 205, it can be sent to the sound reproducer 206, such as speaker or multichannel earphone. The sound signal post-processor sets 205 modulate the amplitude of the analog sound and process with perception weighting. It is obvious that there are a lot of ways to actualize the sound signal post-processor sets 205. The sound reproducer 206 is an element for restoring multichannel sound, wherein the multichannel earphone mode means setting up multichannel output jack on the equipment and connecting with the earphone to listen to the multichannel sound. Moreover, active speaker sets can be also connected with the multi-channel jack as output device.

The functions of the image signal decoder 207, the image signal post-processor 208 and the monitor 209 are the same as those of the sound signal decoder 204, the sound signal post-processor sets 205 and the sound reproducer 206 respectively, only the processed object is the image. In addition, the image signals decoding is the compressed image decoding, e.g. MPEG decoding.

The central processing unit (CPU) and the attaching circuits containing man-machine interface 300 are used to process the control protocol of the whole mobile equipment and to provide I/O devices, such as keyboard and monitor, in which the attaching circuits also contain large scale memory unit. The central processing unit controls playing the stereo music decoded from the received multichannel sound data in real-time, or storing the data in the large-scale memory unit and playing later at the request of user's. In a word, the present equipment has the functions of real-time playing or storing first and playing later under the control of the central processing unit.

The central processing unit can, on the options of user's, control the present equipment working in different transmission modes. The first mode is for common voice transmission; the second is only for music; the third is for both common voice and music. It needn't to say much about the first and the second transmission mode. As for the third mode, voice and music can enter into pickup sets as mixture and will be transmitted with multichannel mode. Besides, voice and music can also enter into pickup sets respectively, then enter into different pickups respectively. In this case, voice can be transmitted with mono channel, while music with multichannel.

The wideband CDMA has capability of multi code channel transmission and time division transmission. Therefore, common voice and music can be transmitted after separate coding, when transmitted respectively. That is, after processed by one of the sound encoder, the common voice is encoded separately under the control of the central processing unit, and then sent to the wideband CDMA modulator, in which it is modulated to a single CDMA code channel. Music is, after encoded, sent to the wideband CDMA modulator, in which it is modulated to another CDMA code channel. A reverse procedure will be run in receiving terminal. The resulted sounds can be played separately on different channels or played after mixing.

Under the precondition without prejudice to the spirit of the present invention, many combination ways, base on different sound source, different mixing ways, different transmission modes and different playing modes, will fall into the scope of the present invention.

The duplexer 400 is a necessary element for realizing duplex communication. When used to isolate sending and receiving signals, we can choose the frequency gap of 75 MHz or 90 MHz on the 2000 MHz frequency range to effectively separate sending and receiving signals. The duplexer 400 has reliable separation so that it could ensure not only sending and receiving signals in a separate status, but also no saturation in the receiving terminal owing to too strong emission signals.

The most common mode of duplex is frequency division duplex (FDD) and time division duplex (TDD), in which TDD mode is widely used in the current wireless access network. On account of the same sending and receiving frequency of the TDD mode, characteristic and performance of forward and reverse channel can basically keep in line. TDD mode is also in favor of optimizing system performance and simplifying terminal equipment with its channel's high correlation. According to the present invention, the technologies such as choice of emission antenna, pre-RAKE merging diversity, and self-adaptive antenna, etc. can be used in base station.

Although FDD duplex mode is taken as example in the above description of the present invention, the present invention is not limited to the FDD duplex mode. To the contrary, TDD duplex mode may be more suitable for it under certain circumstances. However, in TDD mode, the duplexer 400 is connected with the central processing unit to control the on-off of sending and receiving and achieve duplex, while in FDD mode, such connection is not needed.

Although the present invention is designed for mobile communication system, it is apparent that the ideas of the present invention can be also used in a fixing radio access system, even the better performance can be obtained if TDD mode is used in certain fixing radio access system.

The advantage of digital communication lies in the effective separation of source coding and modulation mode. Therefore, the sound coding, wideband CDMA modulation and demodulation, transmission mode and so on referred in the present invention, may develop separately. More effective source coding, modulation and multiple access modes can be tried to find out suitable modulation and multiple access modes, so long as the transmission code rate needed by the source coding and the capacity requirement of the system can be ensured. The wideband CDMA technology can offer such multiple access modes, such system capacity and such transmission code rate. By referring to the WCDMA proposal and its trial system of the IMT 2000 standard resolution, the elements for wideband CDMA modulation and source coding can be designed, and also the self-designed wideband CDMA modulator similar to the demodulation architecture of IS95 mobile station. As well as the discontinuous pilot frequency technology can be adopted. Under the condition of ensuring certain transmission rate and error code rate, CDMA 2000 or other system can be used in the present invention to realize the wideband CDMA mobile equipment capable of transmitting multi-channel sound.

Figure 2:
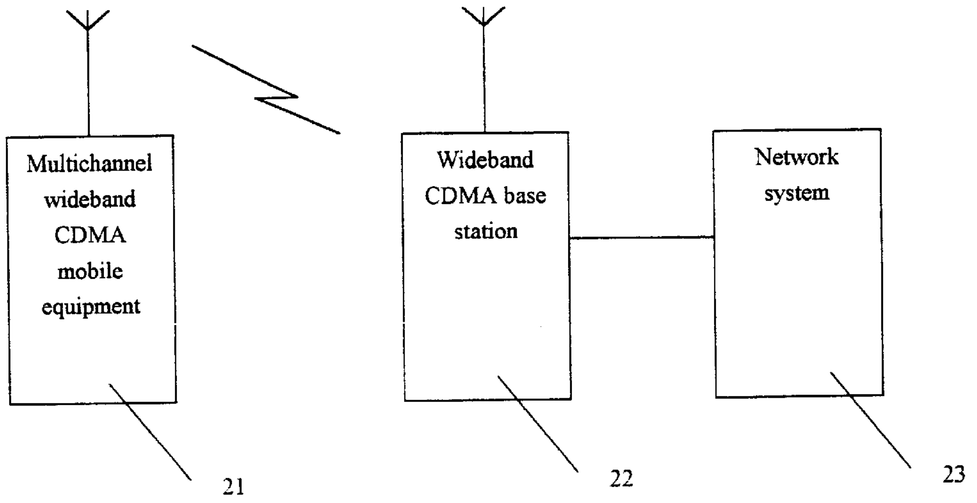
FIG. 2 is a principle block diagram showing the applicable of the mobile equipment of the present invention in the mobile communication system.

Referring to FIG. 2, it shows the applicable status of the present invention, in which 21 is multichannel wideband CDMA mobile equipment; 22 is wideband CDMA base station; 23 is network system.

The network system refers to the mobile net providing wireless access, switching and various services. Apparently, the access function provided by the mobile net enables mobile subscribers to access other networks through the mobile net and obtain various kinds of services.

The exchange or the service-providing unit of the mobile net can store various multichannel sounds needed by users, e.g. a great amount of MP3 music data. On request of users, the exchange or the service-providing unit of the mobile net sends the suitable data to the wideband CDMA base station, by which the multichannel data, e.g. MP3 music data, is transmitted to the multichannel mobile equipment through the radio interface of the wideband CDMA. Then subscribers can enjoy the MP3 music in real-time mode by choice. Subscribers can also choose save mode to store the needed MP3 music in the large-scale memory unit, and then load and play it when needed. This is called load and play mode.

By the Internet access service provided by the mobile net, users can access to Internet. There are many music websites on the Internet, which provide the download service of MP3 music titles. The present equipment can be used to download these music titles through the mobile net and listen to in real-time or save and play later.

The multichannel mobile equipment of the present invention can be used as a MP3 portable player with downloading capability.

Two subscribers of the multichannel mobile equipment can transmit the multichannel sound to each other through the wideband CDMA base station and the mobile net. For instance, user A on a live concert can send the music to the mobile net by using the multichannel wideband CDMA mobile equipment through the wideband CDMA base station, and connect with user B's multichannel wideband CDMA mobile equipment by means of the exchange function of the mobile net, so that user B can listen to the music from the place where user A stands. At the same time, user B can also play the music by himself to user A through the pickup sets, or send the output of a stereo recorder to user A by link the output of the stereo recorder and the line-in interface of multichannel sound. Apparently, both users can enjoy the music by themselves or from the opposite at the same time. This is unheard of and wonderful, which comes only from the present invention.

In combination of image coding, user A can rebroadcast the concert where he locates to user B through the present equipment, and vice versa.

The present invention makes bi-directional real-time multichannel sound and image communication possible. Moreover, owing to the combination of many transmission modes, user A and user B can dial at the same time of listening to the music, here the telephone call is general voice, the music is multichannel sound, both can be independent respectively. Both kinds of sounds can be mixed either in the sending terminal or in the receiving terminal, so that the music could be played over the talk, just like background music.

The mobile equipment of the present invention can be hand-portable or vehicle-loaded or other type of mobile equipment. The mobile equipment can access to the system as terminal equipment of the mobile communication system and transmit multichannel music or voice, in which the mobile communication system can be, without limitation to, the third generation mobile communication system (IMT2000).

Although the embodiments of the present invention are described, it is apparent that various modifications and changes can be made within the spirit and scope of the present invention.

What is claimed is:

1. A wideband CDMA mobile equipment capable of transmitting multichannel sound comprising sending unit, receiving unit, central processing unit (CPU), duplexer and antenna; the central processing unit and the duplexer connect with the sending unit and the receiving unit respectively, the duplexer connects with the antenna, wherein:

the said sending unit includes at least pickup sets, sound signal pre-processing sets, sound signal encoder, channel encoder, wideband CDMA modulator and radio-frequency (RF) sender, they are linked in a sequence, the output of the RF sender, connecting with the input of the duplexer, sends out to the antenna;

the said receiving unit includes at least RF receivers, wideband CDMA demodulator, channel decoder, sound signal decoder, sound signal post-processing sets and sound reproducer, they are linked in a sequence, the signal received by the antenna is sent to the RF receiver via the duplexer;

the said pickup sets are composed of more than one pickup, the said sound signal pre-processing sets are composed of more than one sound signal pre-processor, with each sound signal pre-processor corresponding to one pickup; the said sound signal post-processing sets are composed of more than one sound signal post-processor.

2. The wideband CDMA mobile equipment capable of transmitting multichannel sound according to claim 1, wherein:

the said sending unit includes further pick-up heads, image signal pre-processing unit and image signal encoder, they are linked in a sequence, and the output of the image signal encoder is connected with the input of the said channel encoder;

the said receiving unit includes further image signal decoders, image signal post-processing unit and monitor, they are linked in a sequence, and the input of the image decoder is connected with the output of the channel decoder.

3. The wideband CDMA mobile equipment capable of transmitting multichannel sound according to claim 1, wherein:

the said pickup may be general or Hi-Fi pickup.

4. The wideband CDMA mobile equipment capable of transmitting multichannel sound according to claim 1, wherein:

the said pickup is the line-in interface of multichannel sound.

5. The wideband CDMA mobile equipment capable of transmitting multichannel sound according to claim 1, wherein:

the said sound reproducers is speaker sets, with each speaker corresponding to a sound signal post-processor.

6. The wideband CDMA mobile equipment capable of transmitting multichannel sound according to claim 1, wherein:

the said sound reproducer is the line-out interface of multichannel sound.

7. The wideband CDMA mobile equipment capable of transmitting multichannel sound according to claim 1, wherein:

the said sound reproducer is multichannel earphone linked to a multichannel earphone output jack.

8. The wideband CDMA mobile equipment capable of transmitting multichannel sound according to claim 1, wherein:

the said sound signal encoder is the sound signal encoder MP3 based on MPEG standard or the digital encoder in a CD player, or AC-3 algorithm.

9. The wideband CDMA mobile equipment capable of transmitting multichannel sound according to claim 1, wherein:

the said wideband CDMA modulator is a modulator with BPSK or QPSK spread spectrum mode keeping in line with the spread spectrum mode of the RF sender.

10. The wideband CDMA mobile equipment capable of transmitting multichannel sound according to claim 1, wherein:

the said wideband CDMA demodulator is a demodulator with correlation operation as de-spreading spectrum mode and enhancing signal by RAKE receiver mode.

11. The wideband CDMA mobile equipment capable of transmitting multichannel sound according to claim 1, wherein:

the said duplexer is frequency division duplex (FDD).

12. The wideband CDMA mobile equipment capable of transmitting multichannel sound according to claim 1, wherein:

the said duplexer is time division duplex (TDD), and the said duplexer is connected with the CPU controlling the on-off of receiving and sending.

13. The wideband CDMA mobile equipment capable of transmitting multichannel sound according to claim 1, wherein:

the said CPU includes central processor and attaching circuits containing man-machine interface, in which the attaching circuits includes at least large scale memory unit capable of storing the received multichannel sound data.

14. The wideband CDMA mobile equipment capable of transmitting multichannel sound according to claim 1, wherein:

it can access to the system as terminal equipment of the mobile communication system.

15. The wideband CDMA mobile equipment capable of transmitting multichannel sound according to claim 2, wherein:

it can access to the system as terminal equipment of the mobile communication system.

* * * * *

UNITED STATES PATENT AND TRADEMARK OFFICE

CERTIFICATE OF CORRECTION

PATENT NO. : 6,781,977 B1 Page 1 of 1
DATED : August 24, 2004
INVENTOR(S) : Yingtao Li It is certified that error appears in the above-identified patent and that said Letters Patent is hereby corrected as shown below:

Column 10,
Line 24, insert the following:
-- 16. The wideband CDMA mobile equipment capable of transmitting multichannel sound according to claim 1, wherein:
it can be terminal mobile equipment in forms of portable machine, handset or vehicle machine. --

17. The wideband CDMA mobile equipment capable of transmitting multichannel sound according to claim 2, wherein:
it can be terminal mobile equipment in forms of portable machine, handset or vehicle machine. --

Signed and Sealed this

Twenty-second Day of February, 2005

JON W. DUDAS
*Director of the United States Patent and Trademark Office*